(12) United States Patent
Hall et al.

(10) Patent No.: US 10,270,268 B2
(45) Date of Patent: Apr. 23, 2019

(54) TRICKLE-CHARGED VEHICLE WINCH MECHANISM

(71) Applicants: David R. Hall, Provo, UT (US); Daniel Madsen, Vineyard, UT (US); Benjamin Taylor, Provo, UT (US); Jedediah Knight, Provo, UT (US); Spencer Call, Provo, UT (US)

(72) Inventors: David R. Hall, Provo, UT (US); Daniel Madsen, Vineyard, UT (US); Benjamin Taylor, Provo, UT (US); Jedediah Knight, Provo, UT (US); Spencer Call, Provo, UT (US)

(73) Assignee: Hall Labs LLC, Provo, UT (US)

( * ) Notice: Subject to any disclaimer, the term of this patent is extended or adjusted under 35 U.S.C. 154(b) by 302 days.

(21) Appl. No.: 15/274,092

(22) Filed: Sep. 23, 2016

(65) Prior Publication Data
US 2018/0090953 A1    Mar. 29, 2018

(51) Int. Cl.
*H02J 7/00* (2006.01)
*B66D 1/12* (2006.01)
*B66D 1/22* (2006.01)
*B66D 1/28* (2006.01)

(52) U.S. Cl.
CPC ............ *H02J 7/0042* (2013.01); *B66D 1/12* (2013.01); *B66D 1/22* (2013.01); *B66D 1/28* (2013.01)

(58) Field of Classification Search
CPC ........... H02J 7/0042; B66D 1/12; B66D 1/22; B66D 1/28
See application file for complete search history.

(56) References Cited

U.S. PATENT DOCUMENTS

| 2004/0263100 | A1* | 12/2004 | Heravi ...................... | B60P 3/12 318/280 |
| 2008/0099738 | A1* | 5/2008 | Burns ...................... | B66D 1/12 254/323 |
| 2011/0180770 | A1* | 7/2011 | Karambelas ............. | B66D 1/12 254/344 |
| 2015/0274493 | A1* | 10/2015 | Shiokawa ................ | B66D 1/00 254/323 |
| 2017/0062793 | A1* | 3/2017 | Zakharyan .............. | H01M 2/34 |

* cited by examiner

*Primary Examiner* — Michael E Gallion

(57) ABSTRACT

A vehicle winch mechanism includes a drum, a motor and transmission, at least one drum and motor side support, at least one battery, and a motive trickle charge mechanism. The drum pays out and takes in a line. The motor and transmission drive the drum. The side supports couple the drum, the motor, or both to the vehicle. The battery provides power to the motor. The motive trickle charge mechanism charges the battery. In one embodiment, the motive trickle charge mechanism includes a permanent magnet, an enclosure housing the magnet, and two or more sets of conductive coils wrapped around the enclosure and electrically coupled to the battery. The enclosure houses the magnet such that the magnet freely moves and changes orientation within the enclosure. The coils of an individual set of coils are aligned along parallel planes, and the coils of separate sets are aligned along intersecting planes.

6 Claims, 20 Drawing Sheets ated embodiments that involve an additional advance in the art that have not been included in this application are envisioned and their inclusion in later applications is anticipated.

TRICKLE-CHARGED VEHICLE WINCH MECHANISM

TECHNICAL FIELD

This invention relates generally to the field of winches and more specifically to battery-powered winches.

BACKGROUND

The winch is the indomitable hero of off-road vehicles (ORVs); if you are stuck, there is no more preferable tool! Despite this, providing power to a winch has remained a problem. Most electric winches draw power from the ORV's battery. This significantly reduces the life of the vehicle's battery. This also means that the winch cannot be used independent of the vehicle, or when the vehicle is disabled. Additionally, the duty cycle of the winch is significantly limited when the vehicle's motor is not running, and can result in the vehicle becoming non-operational if the vehicle's battery is completely discharged by the winch. Some solutions presented include powering the winch with a separate battery. However, charging the separate battery puts added strain on the vehicle's motor, and reduces power output. Thus, there is room for improvement in powering winches.

SUMMARY OF THE INVENTION

A vehicle winch mechanism is disclosed that overcomes at least some of the issues described above. The mechanism generally includes a drum driven by a motor, a battery to power the motor, and a motive trickle charge mechanism that charges the battery. The motive trickle charge mechanism takes advantage of the swaying and bouncing motion experienced by a vehicle on many off-road trails to charge the battery. In many cases, this allows for an independent battery that does not rely on the vehicle's motor for recharging. The mechanism is especially useful in embodiments where the winch is only used rarely, and can be used in conjunction with a variety of other trickle charge mechanisms.

The vehicle winch mechanism includes a drum, a motor and transmission, at least one drum and motor side support (side supports), at least one battery, and a motive trickle charge mechanism. The drum pays out and takes in a line. The motor and transmission drive the drum. The side supports couple the drum, the motor, or both to the vehicle. The battery provides power to the motor. The motive trickle charge mechanism charges the battery. In one embodiment, the motive trickle charge mechanism includes a permanent magnet, an enclosure housing the magnet, and two or more sets of conductive coils wrapped around the enclosure and electrically coupled to the battery. The enclosure houses the magnet such that the magnet freely moves and changes orientation within the enclosure. The coils of an individual set of coils are aligned along parallel planes, and the coils of separate sets are aligned along intersecting planes.

In another embodiment, the motive trickle charge mechanism includes one or more springs, one or more permanent magnets, and one or more sets of conductive coils electrically coupled to the battery. The springs couple the side supports to the vehicle. Each magnet is coupled to the vehicle or the side supports. Each set of coils is wrapped around one magnet such that the magnet moves freely through the coil, and each coil is coupled to the side supports or the vehicle such that motion of the side supports relative to the vehicle causes motion of each coil relative to each corresponding magnet.

In yet another embodiment, the motive trickle charge mechanism includes a base plate, one or more mounting rods, one or more permanent magnets, and one or more sets of conductive coils electrically coupled to the battery. The base plate has one or more vertical slots and is coupled to the side supports. The mounting rods couple the base plate to the vehicle, each rod passing through one vertical slot. Each magnet is coupled to the base plate or one rod. Each set of coils is wrapped around one magnet such that the magnet moves freely through the coil. Additionally, each set of coils is coupled to one rod or the base plate such that motion of the base plate relative to the rods causes motion of each set of coils relative to each corresponding magnet.

BRIEF DESCRIPTION OF THE DRAWINGS

A more particular description of the invention briefly described above is made below by reference to specific embodiments. Several embodiments are depicted in drawings included with this application, in which.

DETAILED DESCRIPTION

Figure 1A:
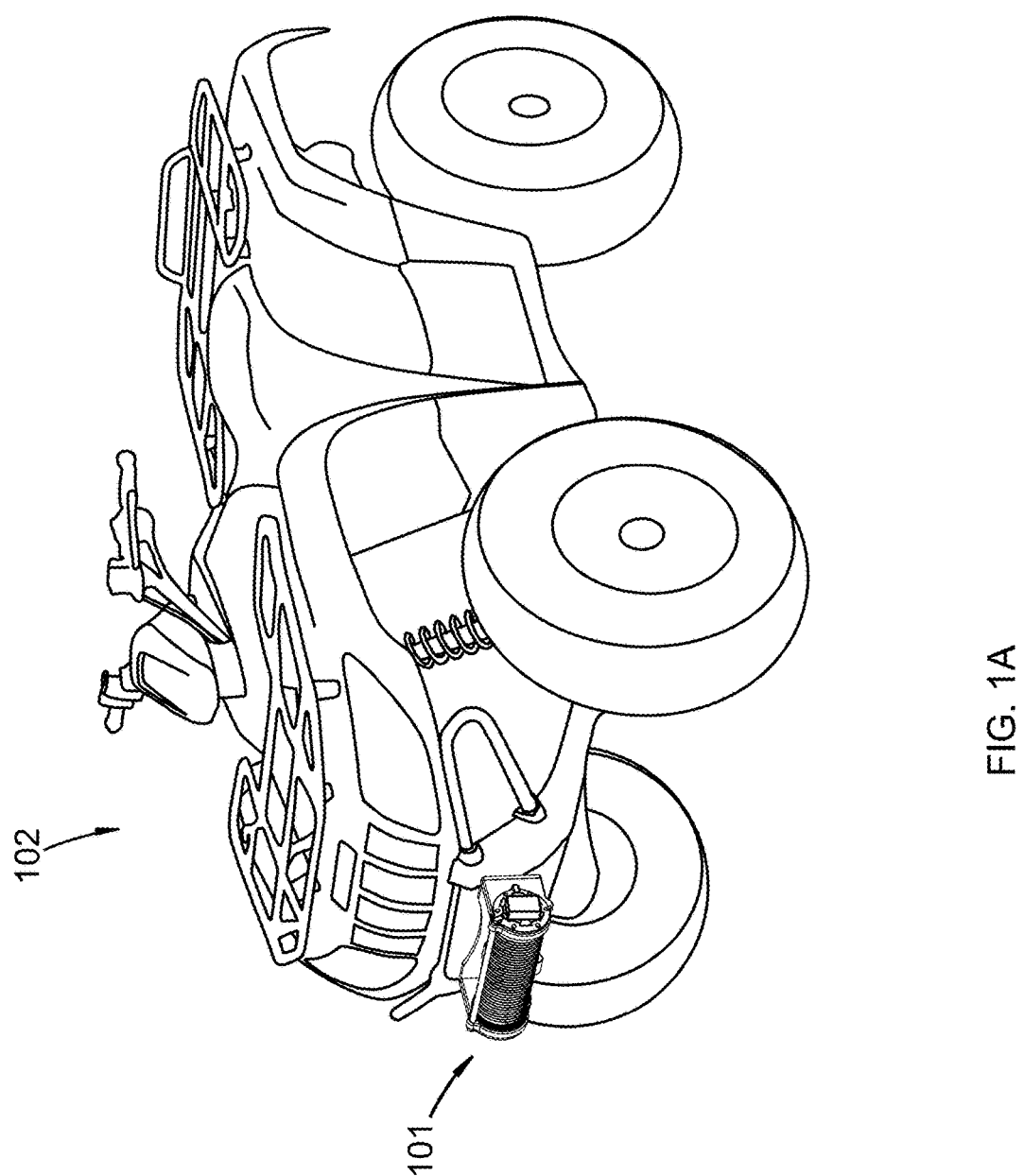
FIGS. 1A-D depict various embodiments of implementations of a vehicle winch mechanism according to the claimed invention.
Figure 1B:
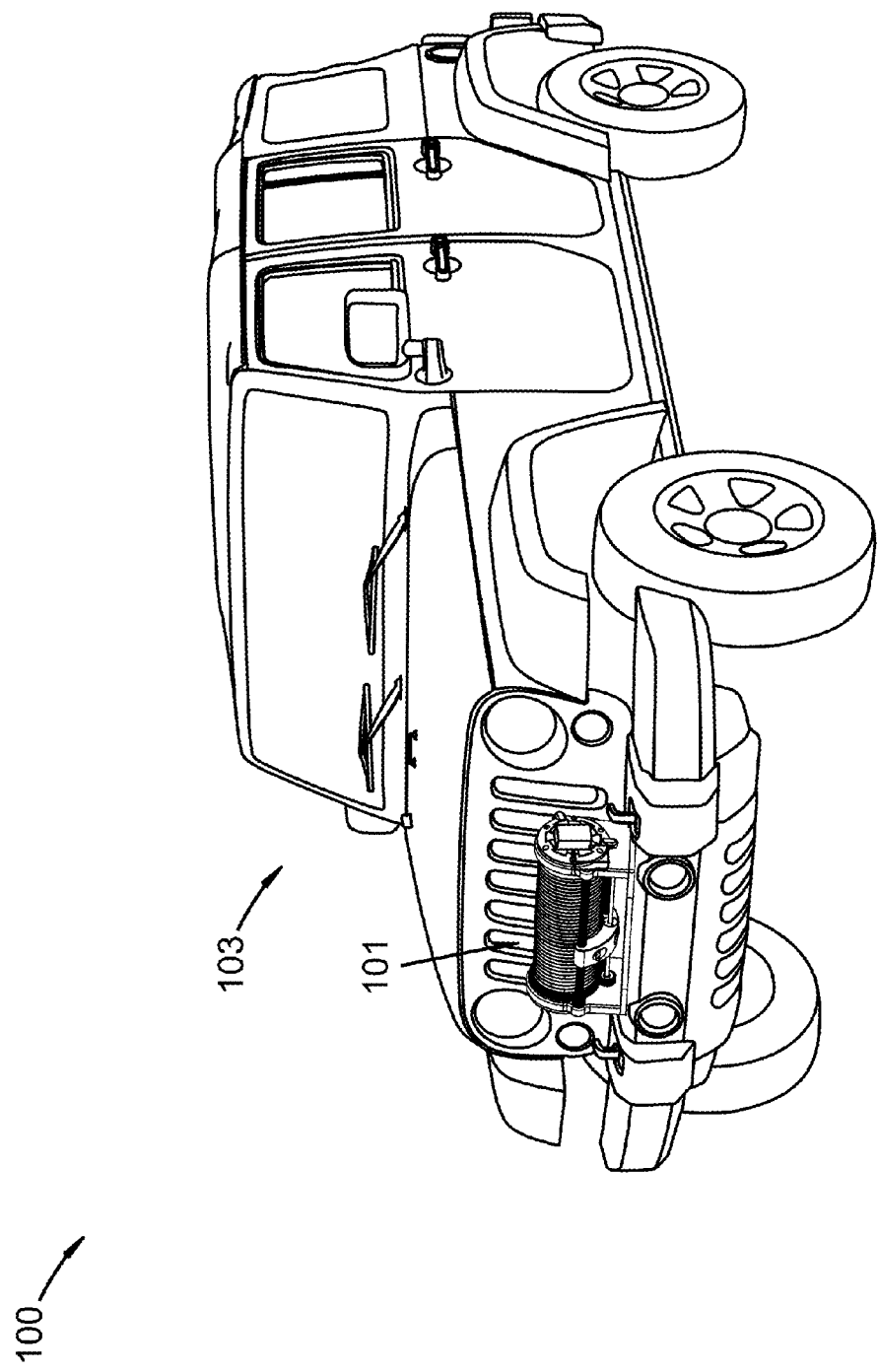
Figure 1C:
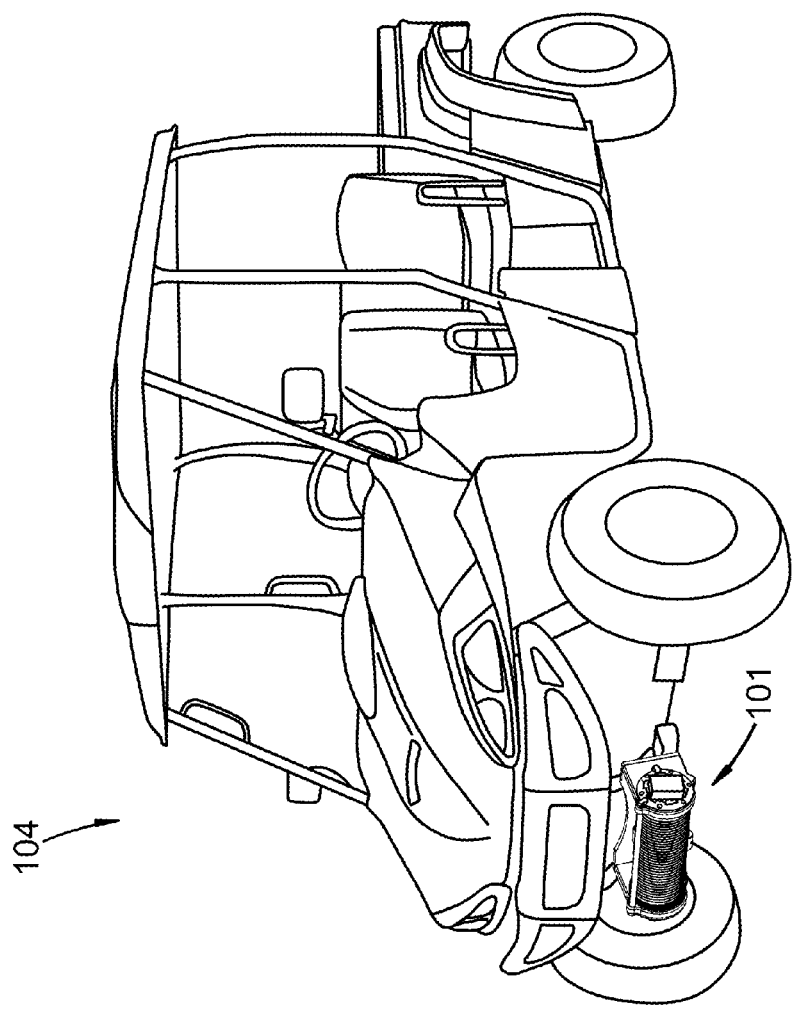
Figure 1D:
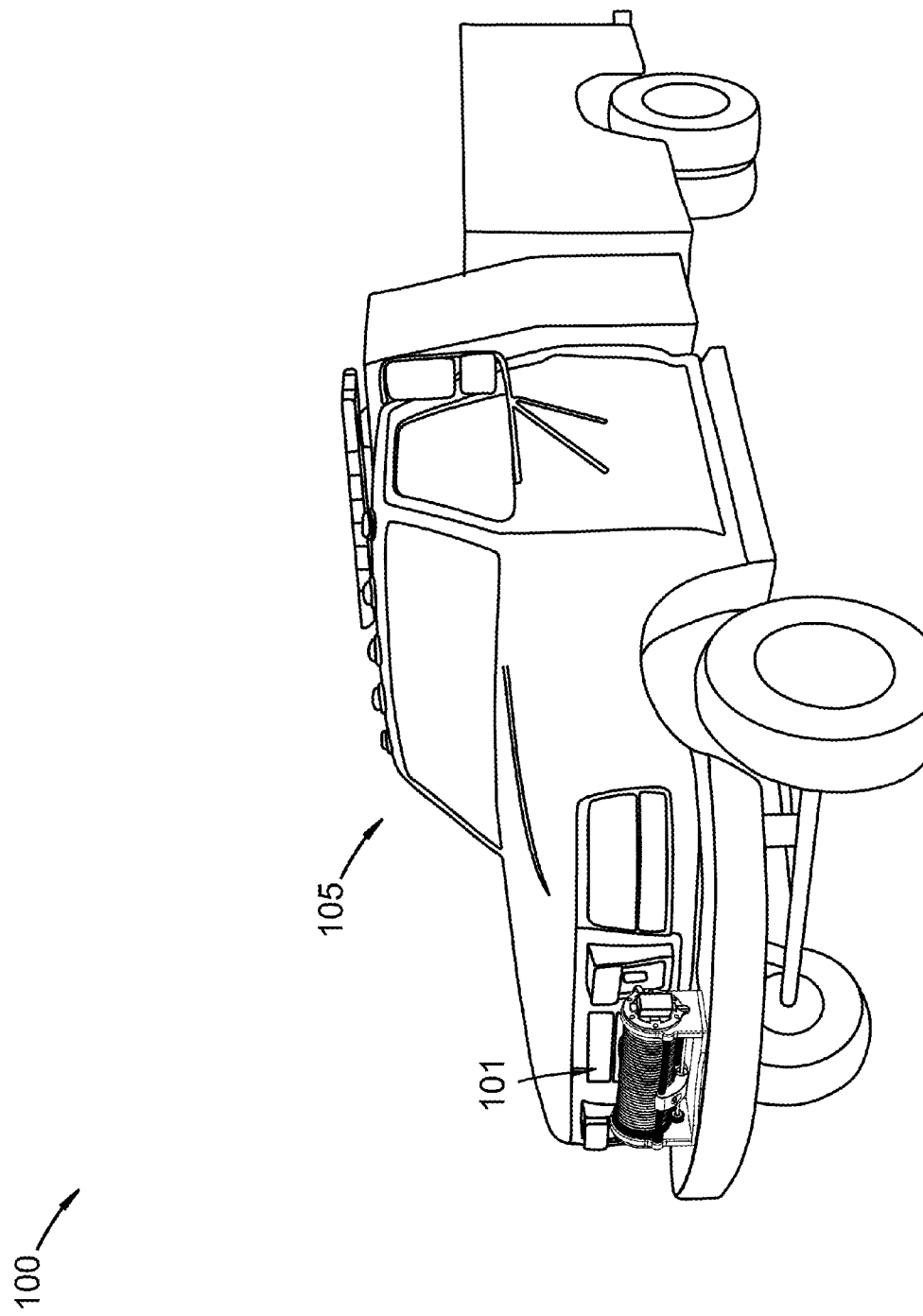

A detailed description of the claimed invention is provided below by example, with reference to embodiments in the appended figures. Those of skill in the art will recognize that the components of the invention as described by example in the figures below could be arranged and designed in a wide variety of different configurations. Thus, the detailed description of the embodiments in the figures is merely representative of embodiments of the invention, and is not intended to limit the scope of the invention as claimed.

The descriptions of the various embodiments include, in some cases, references to elements described with regard to other embodiments. Such references are provided for convenience to the reader, and to provide efficient description and enablement of each embodiment, and are not intended to limit the elements incorporated from other embodiments to only the features described with regard to the other embodiments. Rather, each embodiment is distinct from each other embodiment. Despite this, the described embodiments do not form an exhaustive list of all potential embodiments of the claimed invention; various combinations of the described embodiments are also envisioned, and are inherent from the descriptions of the embodiments below. Additionally, embodiments not described below that meet the limitations of the claimed invention are also envisioned, as is recognized by those of skill in the art.

Throughout the detailed description, various elements are described as "off-the-shelf." As used herein, "off-the-shelf" means "pre-manufactured" and/or "pre-assembled."

In some instances, features represented by numerical values, such as dimensions, quantities, and other properties that can be represented numerically, are stated as approximations. Unless otherwise stated, an approximate value means "correct to within 50% of the stated value." Thus, a length of approximately 1 inch should be read "1 inch+/−0.5 inch." Similarly, other values not presented as approximations have tolerances around the stated values understood by those skilled in the art. For example, a range of 1-10 should be read "1 to 10 with standard tolerances below 1 and above 10 known and/or understood in the art."

FIGS. 1A-D depict various embodiments of implementations of a vehicle winch mechanism according to the claimed invention. In general, winch 101 is useful for use on off-highway vehicles, such as ATV 102, Jeep 103, UTV 104, or rescue vehicle 105. While only a few examples are depicted, those of skill in the art recognize that FIGS. 1A-D are merely representative of the wide host of vehicles with which winch 101 is useful. Thus, the claimed invention is not to be interpreted as being limited to those applications depicted, but rather to the particular features enumerated and described in the Claims. Additionally, though winch 101 is shown on a front bumper of each vehicle 102-105, winch 101 is positioned, in other embodiments, in a variety of other positions around the vehicles. For example, in one embodiment, winch 101 is embedded within bumper 101a. In another embodiment, winch 101 is detachable and stored in, for example, a utility box. In yet other embodiments, winch 101 is mounted to a rear bumper of a vehicle.

Figure 2A:
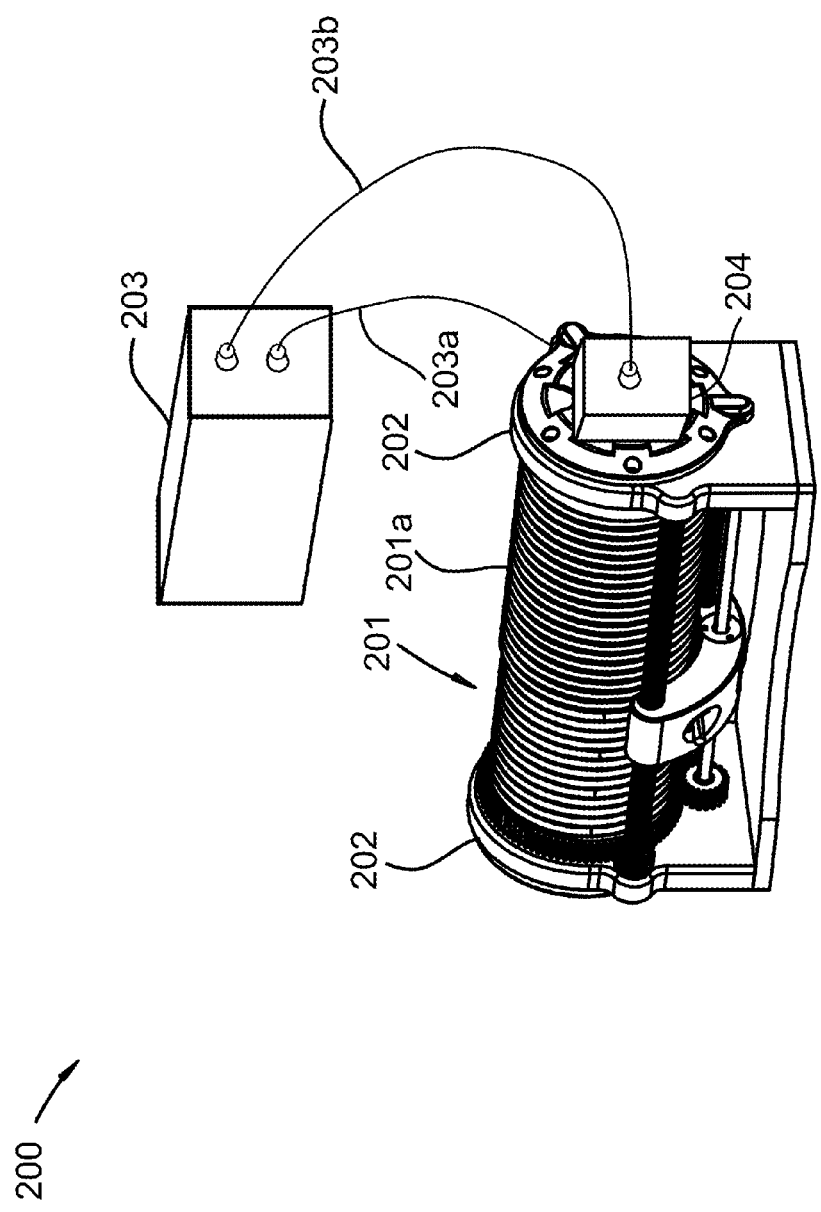
FIGS. 2A-D depict various views of one embodiment of a vehicle winch mechanism according to the claimed invention.
Figure 2B:
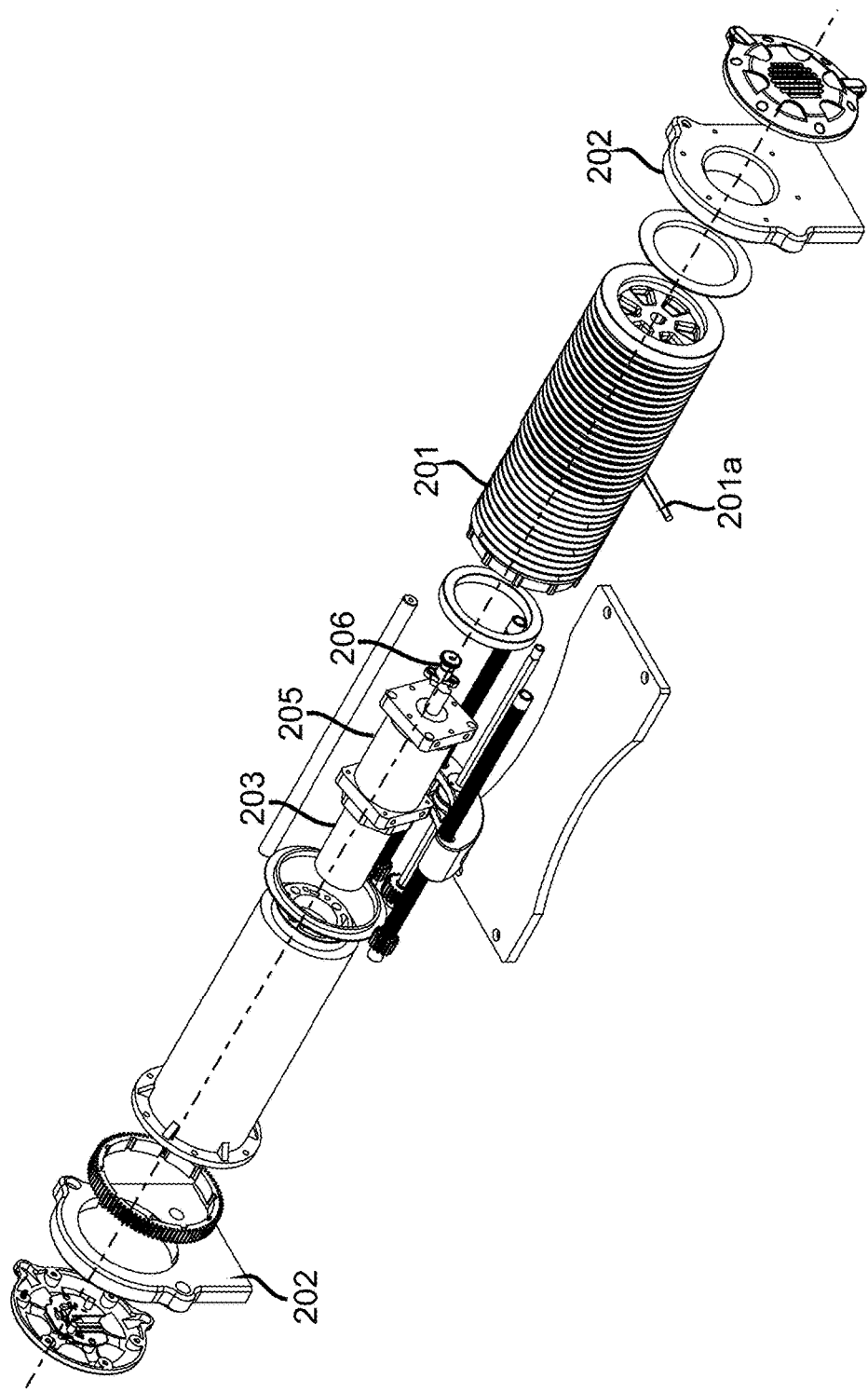
Figure 2C:
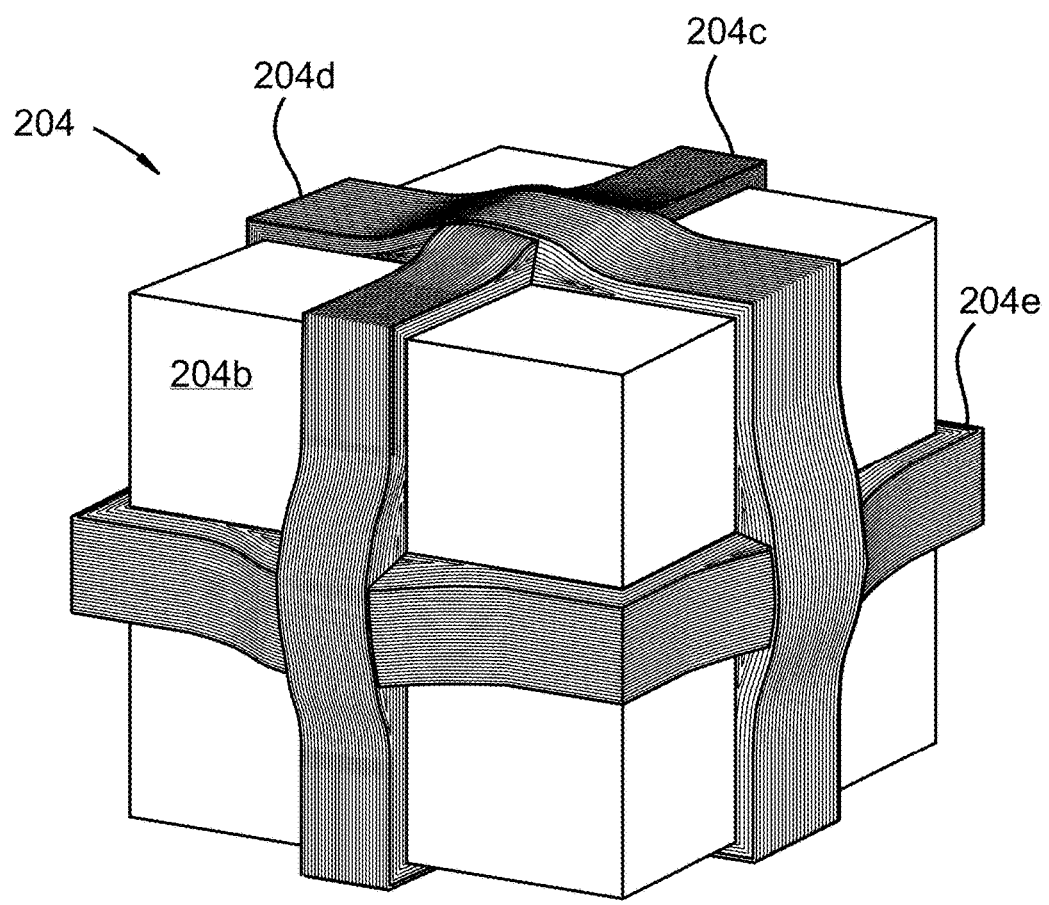
Figure 2D:
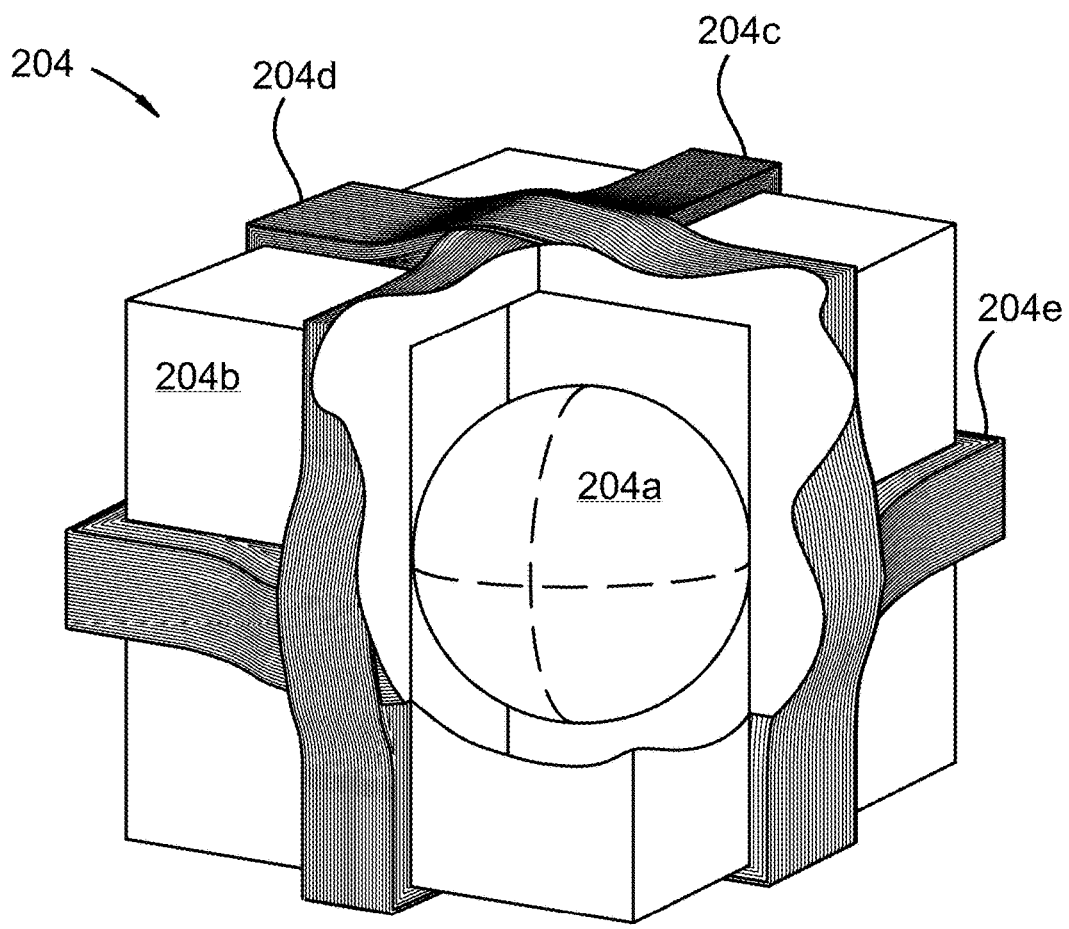

FIGS. 2A-D depict various views of one embodiment of a vehicle winch mechanism according to the claimed invention. As shown in FIG. 2A, winch mechanism 200 includes drum 201, side supports 202, battery 203, and motive trickle charge mechanism 204. As shown in FIG. 2B, winch mechanism 200 also includes motor 205 and transmission 206. Drum 201 pays out and takes in line 201a. Motor 205 and transmission 206 drive drum 201. Side supports 202 couple drum 201 and/or motor 205 to a vehicle, such as is described above with regard to FIGS. 1A-D. Battery 203 provides power to motor 205, such as via wire 203a, and motive trickle charge mechanism 204 charges battery 203, such as via wire 203b. As shown in FIGS. 2C-D, motive trickle charge mechanism 204 includes permanent magnet 204a, enclosure 204b, and conductive coil sets 204c,d,e. Enclosure 204b houses magnet 204a such that magnet 204a freely moves, changes orientation, or both, within enclosure 204b. Coil sets 204c are wrapped around enclosure 204b and are electrically coupled to battery 203, such as via wire 203b shown in FIG. 2A. The coils of each individual coil set 204c,d,e are aligned along parallel planes, and the coils of separate coil sets, such as 204c compared to 204d or 204e, are aligned along intersecting planes.

Drum 201 is, in many embodiments, a right circular cylindrical drum. However, in some embodiments, drum 201 is any of a variety of cylindrical shapes, such as an elliptic cylinder, a parabolic cylinder, a hyperbolic cylinder, and/or an oblique cylinder. In yet other embodiments, drum 201 is a cuboid, a rounded cuboid, a triangular prism, and/or any of a variety of other polyhedral shapes. Additionally, in some embodiments, drum 201 is hollow, such as in embodiments where the motor and the hammer and anvil mechanism are positioned within drum 201. In other embodiments, drum 201 is partially hollow or completely solid, such as in embodiments where the hammer and anvil mechanism is around the outside of drum 201. Additionally, as depicted, in some embodiments, drum 201 includes a helical groove that guides line 201a as line 201a is wound onto drum 201.

Line 201a winds around drum 201, and is made any of a variety materials compatible with use on a winch, such as nylon, polypropylene, polyester, UHMWPE, aramid, cotton, Kevlar, steel cable, and/or coated steel cable, among others. Additionally, in some embodiments, line 201a is a rope, whereas in other embodiments line 201a is a strap. In some embodiments, line 201a comprises a wear-resistant material. For example, in some embodiments, line 201a comprises a tribological material having a coefficient of friction greater than 1.

Side supports 202 mount winch 200 to any of a variety of base plates in any of a variety of orientations, such as horizontal, vertical, right-side up, and upside down. Thus, side supports 202 are made of any of a variety of materials sufficient to withstand torque created by winch 200 bearing a load and, in some cases, additional torque caused by gravity. In some embodiments, side supports 202 are a steel and/or aluminum alloy. In other embodiments, side supports 202 are a hardened and/or thermoset plastic, such as nylon, acrylic, HDPE, and/or melamine. In some embodiments, side supports 202 include anti-vibration materials. In such embodiments, side supports 202 include, or consist of, sorbothane, neoprene, nitrile, cork, rubber, or combinations thereof.

Battery 203 is any of a variety of off-the-shelf batteries sufficient to handle loads placed on winch 200. For example, in one embodiment, battery 203 is a 12V, 20A Li-Ion battery. However, other configurations, including other power ratings and chemistries, are also envisioned. One of skill in the art recognizes the variety of configurations of battery 203 necessary and/or sufficient to power winch 200. Additionally, though only one battery is depicted, some embodiments includes multiple separate battery packs and/or combinations of battery cells in a single battery pack. As shown in FIG. 2A, in some embodiments, battery 203 is disposed outside and separate from drum 201. However, as shown in FIG. 2B, in some embodiments, battery 203 is mounted inside drum 201.

As described above, motive trickle charge mechanism 204 includes magnet 204a, enclosure 204b, and conductive coil sets 204c,d,e. Mechanism 204 takes advantage of vibration, swaying, and bouncing that often occurs while operating an off-road vehicle to trickle charge battery 203. As the vehicle bounces and sways, magnet 204 passes back and forth through coil sets 204c,d,e, thereby inducing a current in coil sets 204c,d,e that is used to charge battery 203.

Magnet 204a is any of a variety of magnetic materials, including magnetic ores such as iron, cobalt and/or nickel, magnetic ceramics such as ferrite, and rare earth composites including samarium, neodymium and/or strontium, among others. Additionally, magnet 204a includes a variety of shapes. In the depicted embodiment, magnet 204a is a neodymium-composite sphere. However, in other embodiments, magnet 204a is a cube.

Enclosure 204b houses magnet 204a such that magnet 204a is free to move and change orientation within enclosure 204b as the vehicle sways, bounces and vibrates. Thus, in some embodiments, enclosure 204b is large enough relative to magnet 204a to allow magnet 204a to pass completely from one side of one coil set 204c,d or e to the other side. For example, in one embodiment, enclosure 204*b* has a width equal to twice a width of magnet 204*a* plus a width of coil set 204*c,d* or *e*.

Enclosure 204*b* is made of any of a variety of materials sufficient to withstand violent impacts of magnet 204*a* against enclosure 204 while still being substantially magnetically transparent. Many materials satisfy this requirement, including many hardened and/or thermoset plastics. As shown in the depicted embodiments, coil sets 204*c,d,e* wrap around an outside surface of enclosure 204*b*. However, in some embodiments, enclosure 204*b* is molded around coil sets 204*c,d,e* such that a thin layer of material is positioned directly between coil sets 204*c,d,e* and magnet 204*a*, while providing a thick, supportive and impact-resistant structure around magnet 204*a* and coil sets 204*c,d,e*. In some such embodiments, enclosure 204*b* also encloses coil sets 204*c, d,e*, leaving only electrical contacts exposed, or, alternatively, having shielded wiring leading from mechanism 204 to battery 203. In other embodiments, a second enclosure is provided that encloses enclosure 204*b* and coil sets 204*c,d,e*.

Coil sets 204*c,d,e* are coils of electrically conductive wire wound around enclosure 204*b*. Thus, in some embodiments, coil sets 204*c,d,e* include copper wire. In some embodiments, coil sets 204*c,d,e* include a dielectric shielding around the wire. The depicted embodiment shows three coil sets 204*c,d,e*, each aligned along a plane perpendicular to each other set. However, some embodiments include only two coil sets, whereas other embodiments include more coil sets, such as 4 or more coil sets. In such embodiments, each coil set intersects each other set. In some embodiments, such as the depicted embodiment, the coil sets are interwoven.

Motor 205 is any of a variety of AC or DC electric motors. In AC embodiments, a DC/AC converter is included between motor 205 and battery 203. Motor 205 is contained at least partially within housing 201*b*, which is within drum 201, and which shields motor 205 from rotating drum 201 and fixes motor 205 to side supports 202, which thereby provide counter-forcing support to motor 205, so that motor 205 can transfer power to drum 201. In some embodiments, motor 205 is completely within housing 201*b* and, thus, completely within drum 201. However, in other embodiments, motor 205 is disposed outside drum 201 and is coupled to, for example, one side support 202.

Transmission 206 is any of a variety of power transmission mechanisms. In one embodiment, such as that depicted in FIG. 2B, transmission 206 includes one or more sets of planetary gears. In another embodiment, transmission 206 includes a hammer and anvil mechanism, where motor 205 rotates the hammer, which strikes the anvil and rotates drum 201. In yet other embodiments, transmission 206 simply includes a rod that transfers power directly from motor 205 to drum 201. As shown in FIG. 2B, transmission 206 is mounted within drum 201. In embodiments where motor 205 is disposed outside, or only partially within drum 201, transmission is disposed either within or outside drum 201.

Figure 3A:
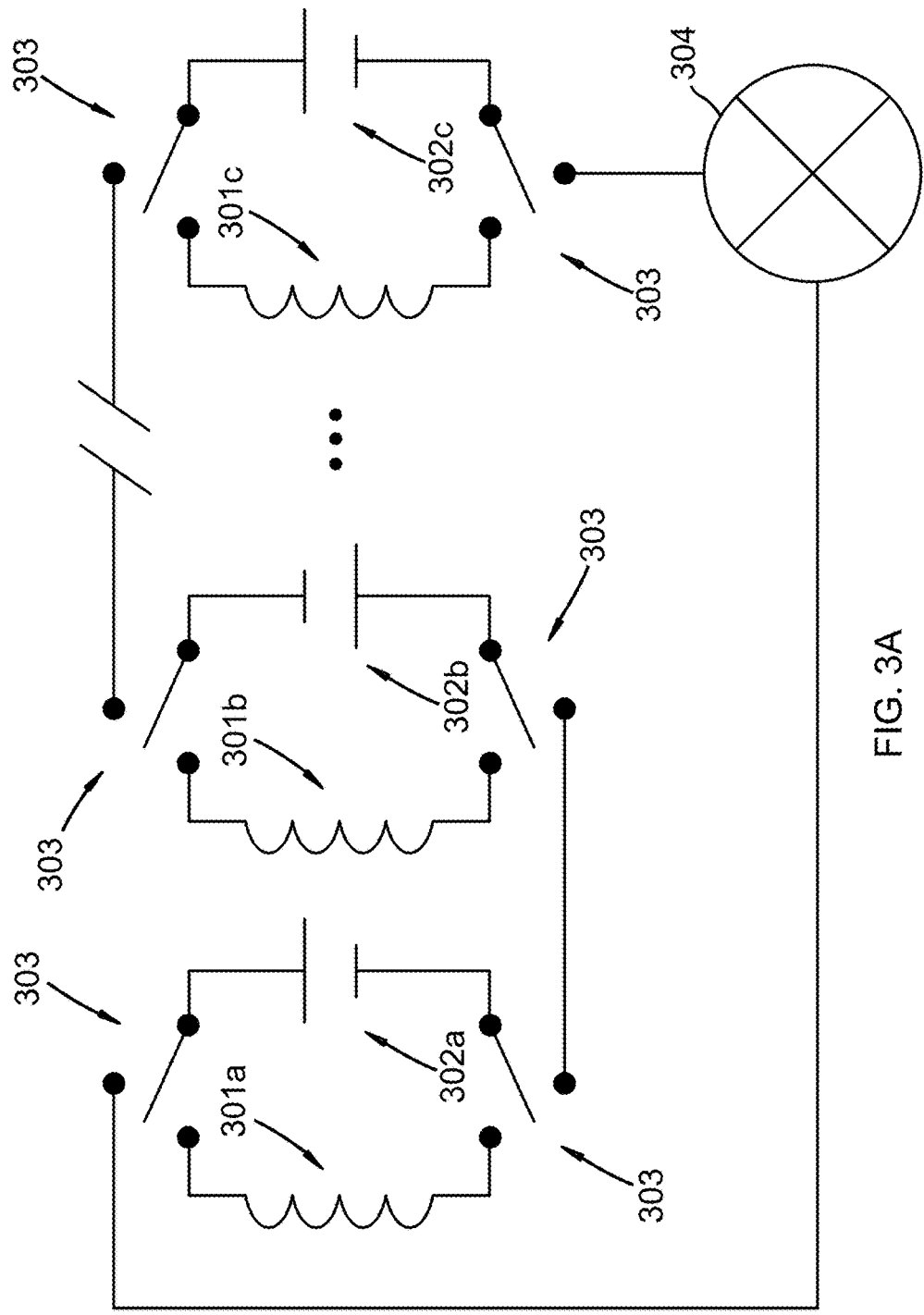
FIGS. 3A-C depict various schematics and views of a winch mechanism according to the claimed invention.
Figure 3B:
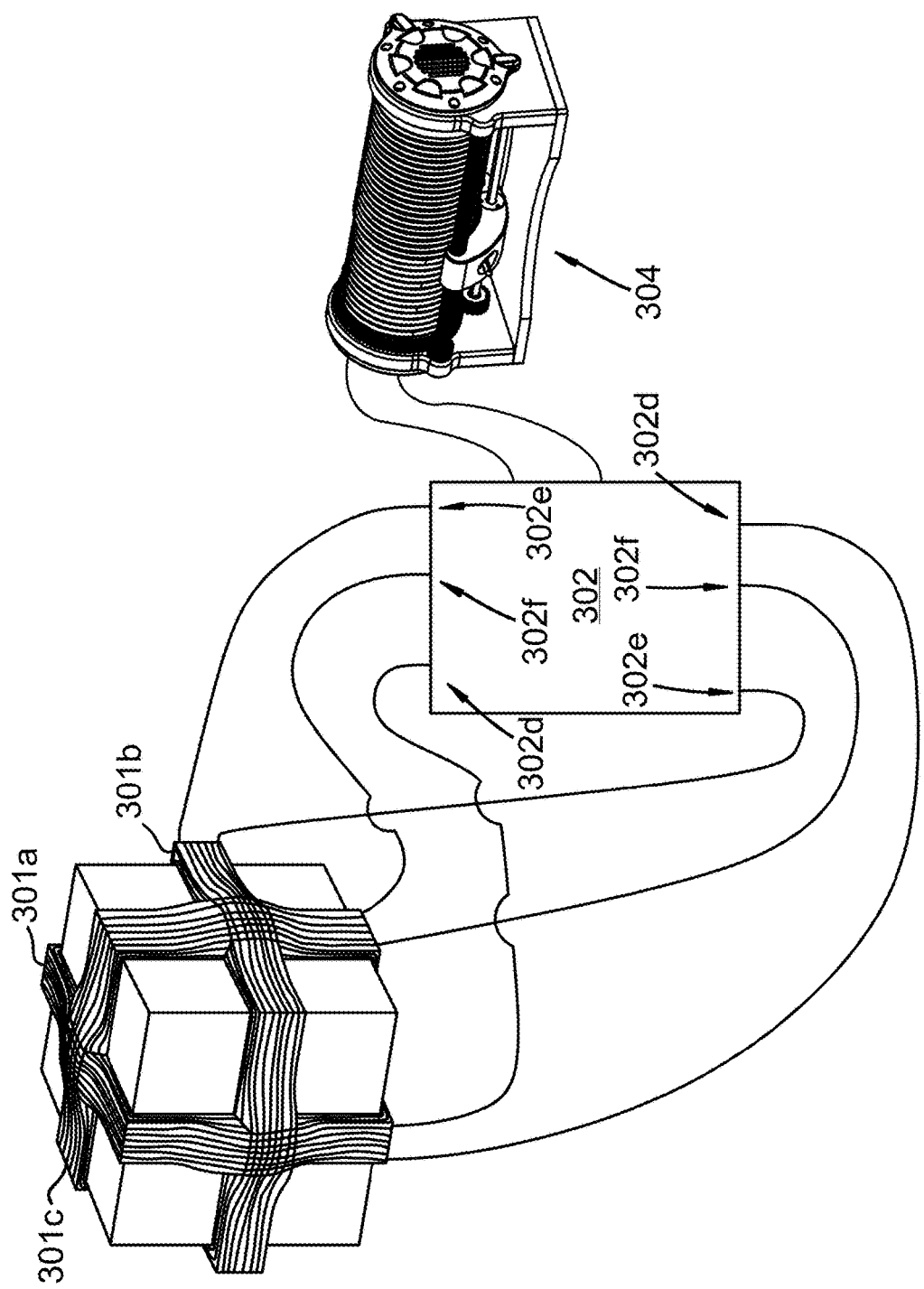
Figure 3C:
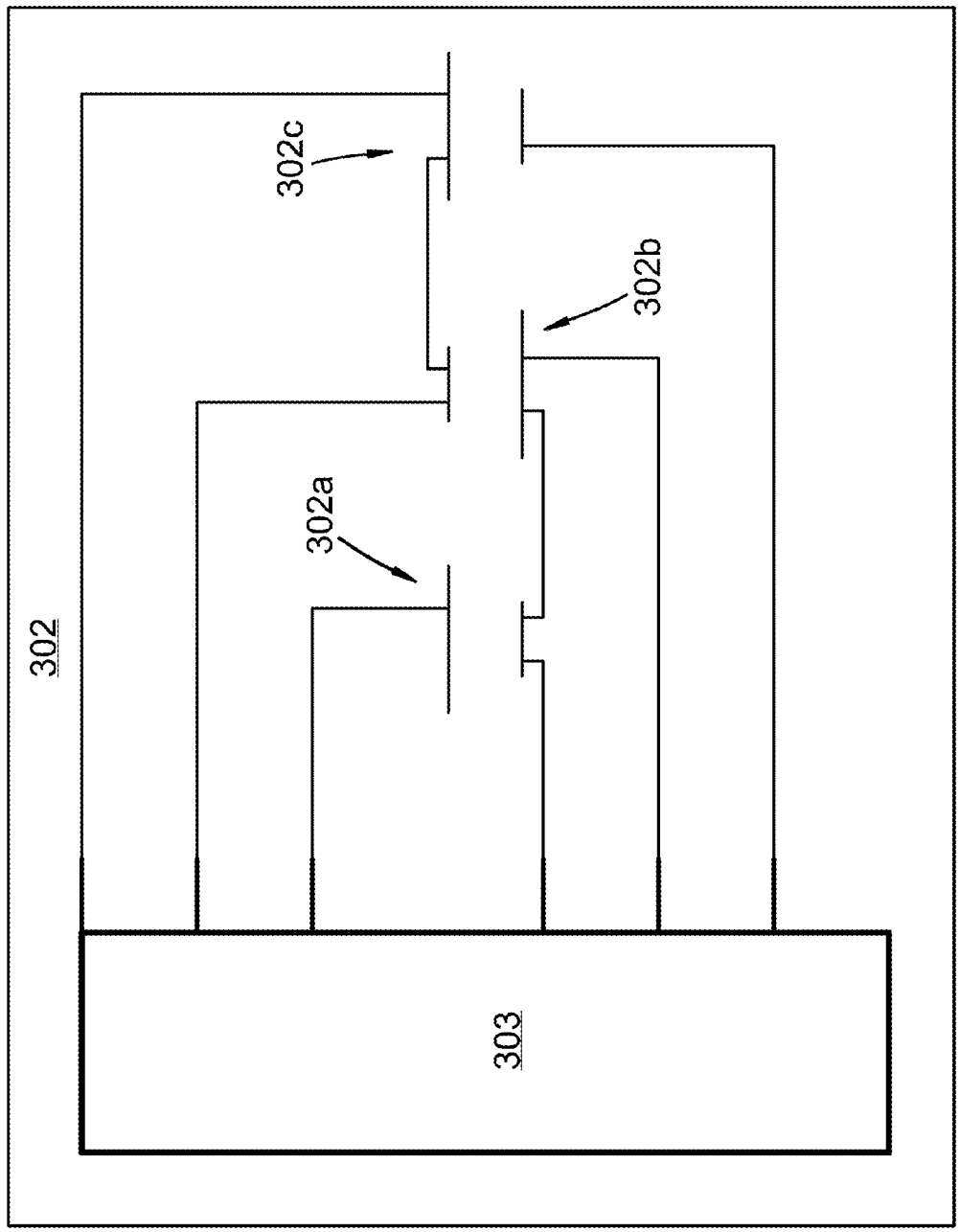
Figure 4A:
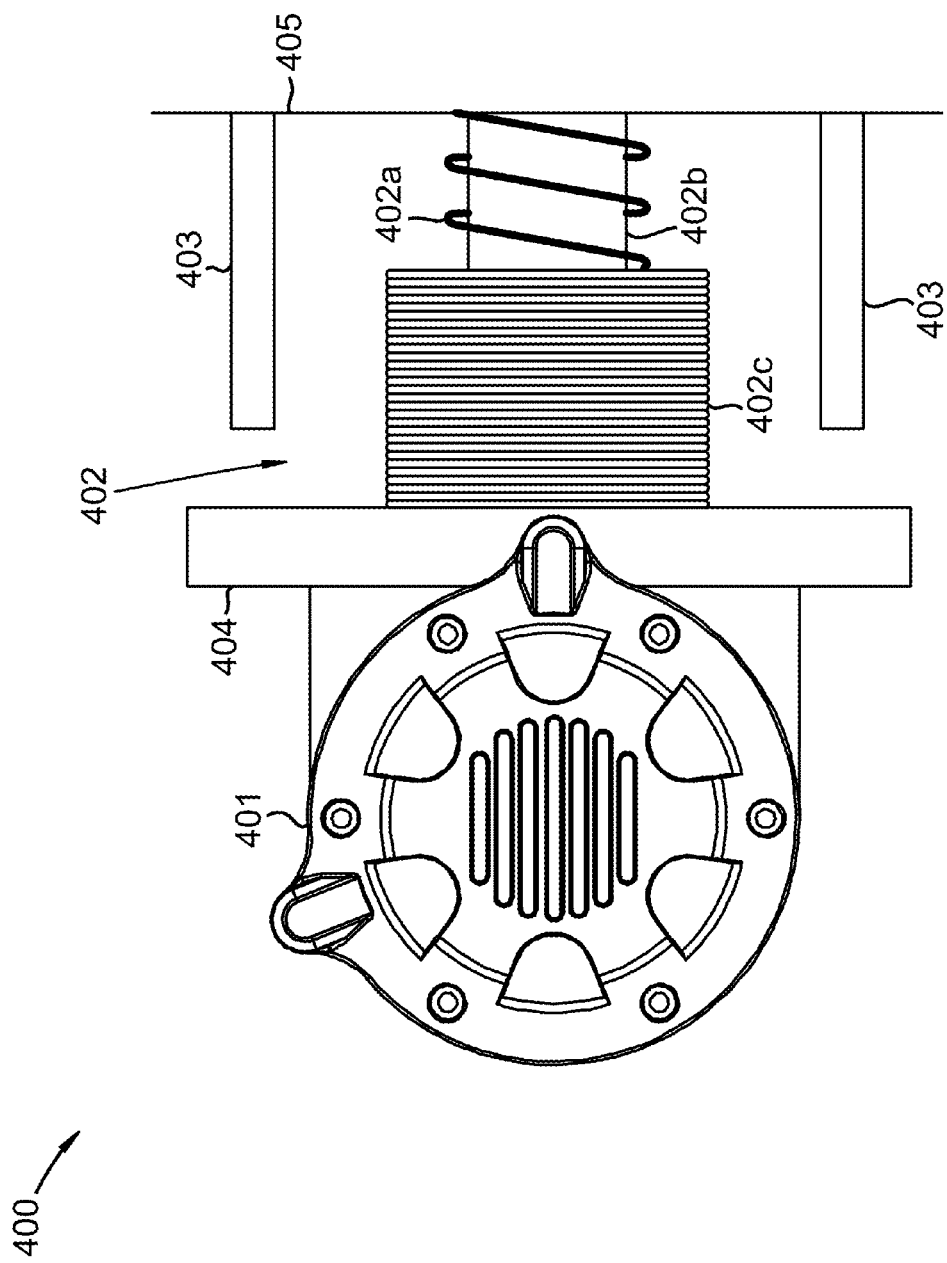
FIGS. 4A-D depict various views of an alternative motive trickle charge mechanism in accordance with the claimed invention.
Figure 4B:
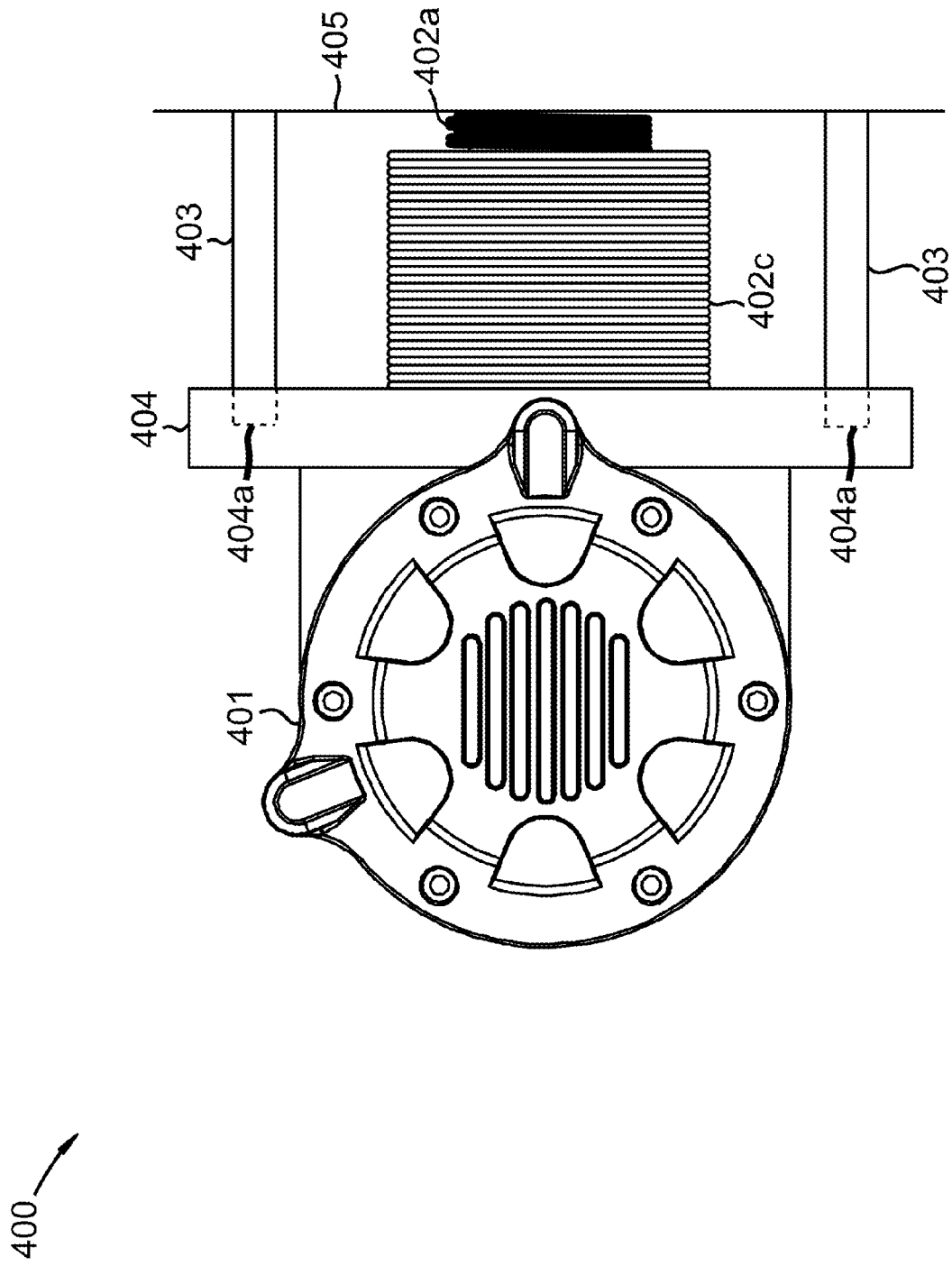
Figure 4C:
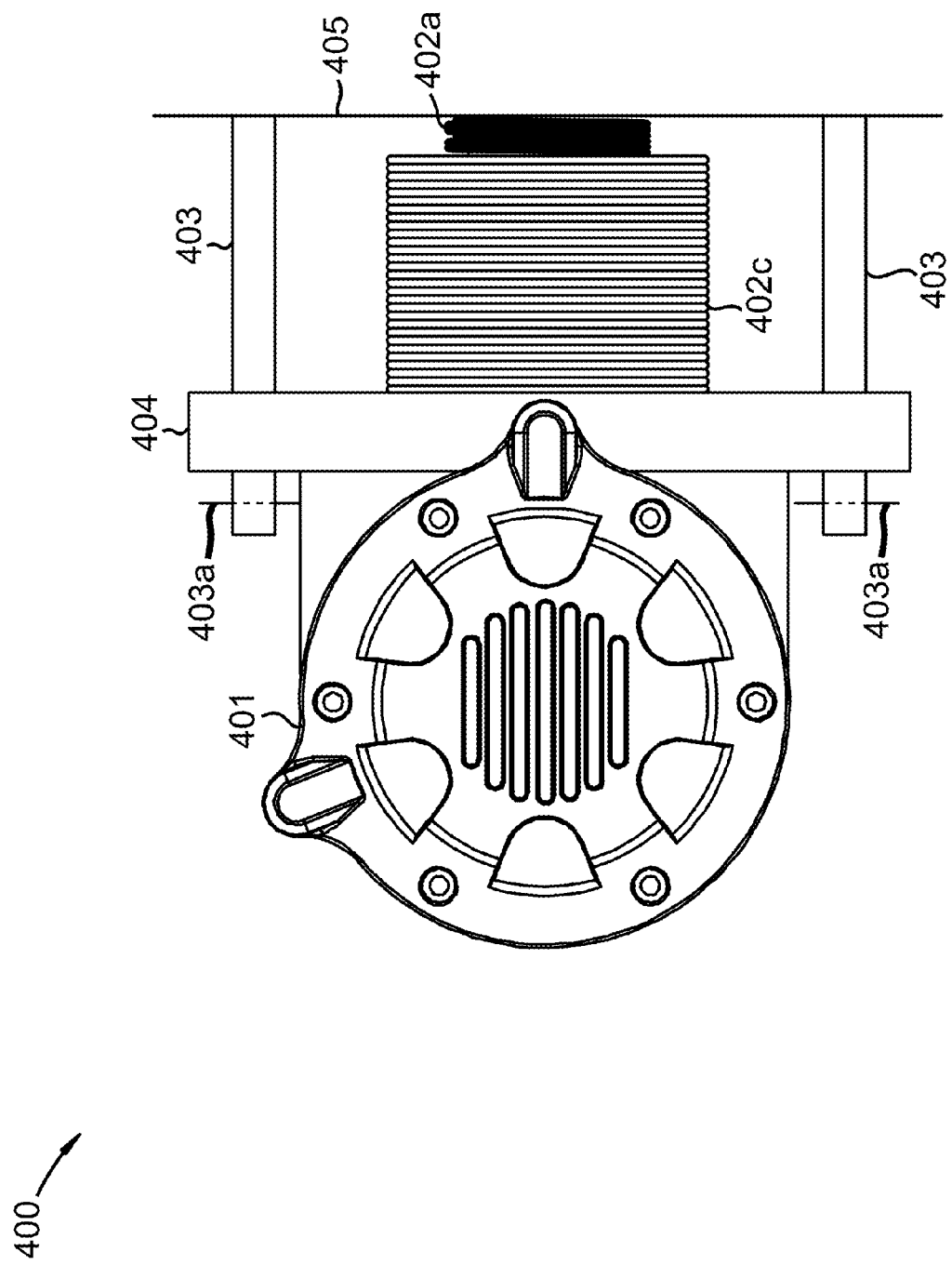
Figure 4D:
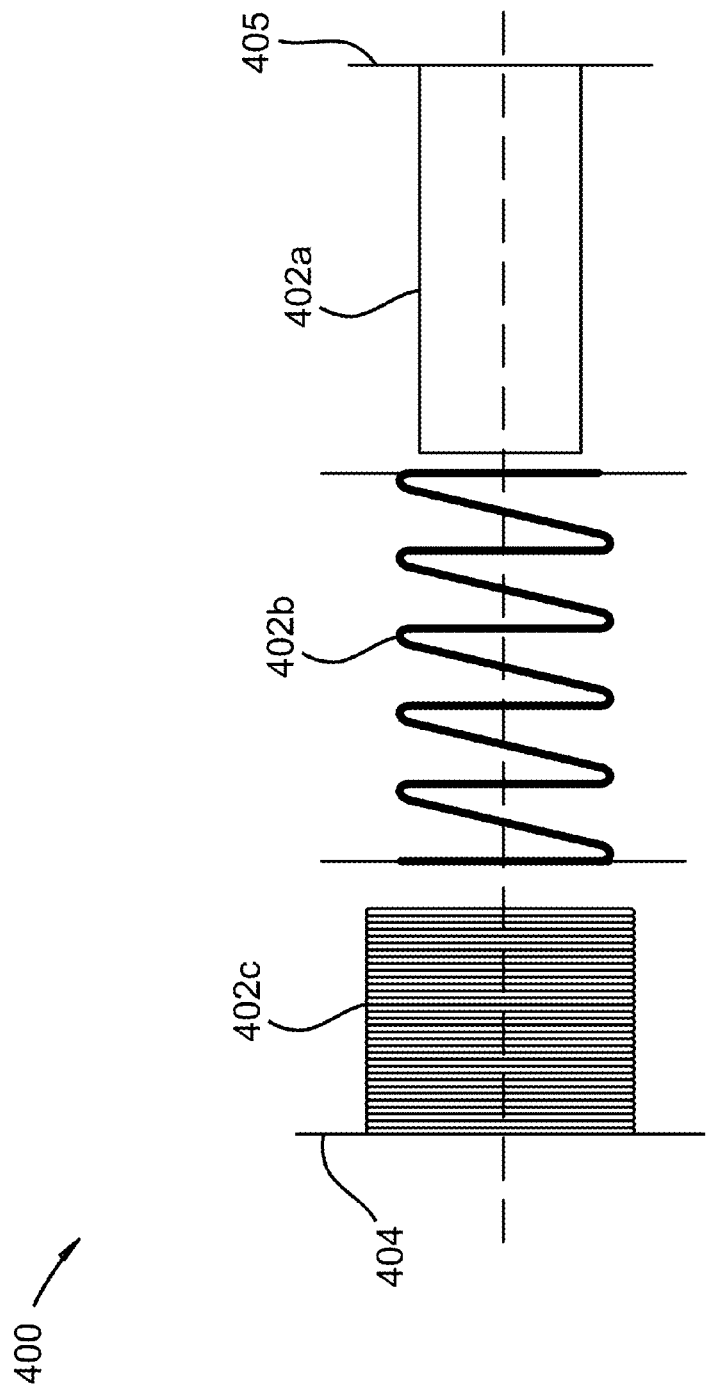

FIGS. 3A-C depict various schematics and views of a winch mechanism according to the claimed invention. FIG. 3A depicts one example schematic of a battery and coil arrangement. As described above, the various embodiments of the vehicle winch mechanism include one to several batteries and/or battery cells. In embodiments with one battery having one cell or several cells connected in series, or in embodiments with several batteries, all connected in series, it is beneficial to connect each coil set in series so that the current generated in each coil is accumulated to charge the battery and/or batteries. However, in other embodiments, such as that depicted in FIG. 3A, it is beneficial to have at least one battery for each set of coils, each set of coils electrically coupled to a separate battery from each other set of coils, and each battery electrically coupled to each other battery in series. As shown, coils 301*a,b,c* are each coupled to separate batteries 302*a,b,c*, respectively, in separate circuits. Batteries 302*a,b,c* together form battery unit 302, which powers winch 304. Though shown as batteries, in some embodiments, batteries 302*a,b,c* are individual cells in a single battery. In such embodiments, each cell is electrically coupled to a separate coil set from among coils 301*a,b,c*. As shown in FIG. 3B, in embodiments where each coil set 301*a,b,c* is coupled to a different battery cell, battery 302 includes a set of electrical contacts 302*d,e,f* for each coil set 301*a,b,c*, respectively.

Some embodiments of the vehicle winch mechanism where each coil set is coupled to a separate battery and/or battery cell additionally, or necessarily, include one or more switches, such as switches 303 shown in FIGS. 3A and 3C. Switches 303 switch the winch between a charge mode and an operate mode such that, in charge mode, each battery and/or battery cell 302*a,b,c* is coupled to a separate circuit to corresponding coil sets 301*a,b,c*, and such that, in operate mode, each battery and/or battery cell 302*a,b,c* is coupled to each other battery and/or battery cell 302*a,b,c* in series. In some embodiments, such as that depicted in FIG. 3A, switches 303 include one or more manual selector switches. In other embodiments, switches 303 include one or more logic gates controlled by one or more processors. In yet other embodiments, switches 303 are software switches programmed into a controller.

FIGS. 4A-D depict various views of an alternative motive trickle charge mechanism in accordance with the claimed invention. Similar to the embodiment depicted in FIG. 2, vehicle winch mechanism 400 includes a drum (not shown, but similar to drum 201 described above), a motor and transmission that drive the drum (also not shown, but similar to motor 205 and transmission 206 described above), side support 401, a battery (not shown, but similar to batteries 203 and 302 described above), and motive trickle charge mechanism 402. Motive trickle charge mechanism 402 charges the battery, and includes spring 402*a*, permanent magnet 402*b*, and conductive coil set 402*c*. Additionally, winch 403 includes locking rods 403 and base plate 404. Spring 402*a* couples side support 401 to vehicle surface 405. Magnet 402*b* is coupled to vehicle surface 405. However, in some embodiments, magnet 402*b* is alternatively coupled to side support 401. Coil set 402*c* is electrically coupled to the battery and wrapped around magnet 402*b* such that magnet 402*b* moves freely through coil set 402*c*. Coil set 402*c* is coupled to side support 401 or vehicle surface 405 such that motion of side support 401 relative to vehicle surface 405 causes motion of coil set 402*c* relative to magnet 402*b*.

Motive trickle charge mechanism 402 takes advantage of the bouncing, swaying and vibrating often experienced by ORVs to trickle charge the battery. As the vehicle bounces, sways, and vibrates, spring 402*a* allows side support 401 to move semi-independently of vehicle surface 405. As spring 402*a* extends, bends, and/or compresses, magnet 402*b* moves in and out of coil set 402*c*, generating a current in coil 402*c* and charging the battery.

Spring 402*a* is any of a variety of springs sufficient to support the weight of winch 400. In some embodiments, such as those depicted in FIGS. 4A-D, spring 402*a* is disposed laterally between base plate 404 and vehicle surface 405. In some such embodiments, spring 402*a*'s spring constant is proportional to the weight of the drum, motor, transmission, line, and side support 401 such that, in a static state, spring 402a is extended only an insignificant amount. An insignificant amount is, for example, roughly less than 10% of spring 402a's stand-alone equilibrium length. In other embodiments, similar to those depicted in FIGS. 5A to 7, spring 402a is disposed beneath side support 401 between side support 401 and base plate 404. In some such embodiments, spring 402a has a spring constant such that spring 402a is compressed an insignificant amount in a static state. Conversely, spring 402a's spring constant is low enough to allow for significant travel of the spring and, thus, movement of magnet 402b in and out of coil set 402c. Significant travel ranges, in various embodiments, from 20% to 150% of spring 402a's stand-alone equilibrium length. However, spring 402a's spring constant is still high enough to resist over-extending under expected off-road conditions.

As depicted, spring 402a couples directly to coil set 402c which, in turn, is coupled to base plate 404. In this and similar embodiments, base plate 404 is disposed laterally adjacent to side support 401 and is coupled to spring 402a via coil set 402c between side support 401 and springs 402a. In some embodiments, spring 402a is coupled directly to base plate 404. In some such embodiments, magnet 402b and coil set 402c are disposed within spring 402a, magnet 402b coupled to vehicle surface 405 or base plate 404, and coil set 402c coupled oppositely to base plate 404 or vehicle surface 405.

Locking rods 403 lock winch 400 to vehicle surface 405 and prevent motion of winch 400 with respect to vehicle surface 405. In some embodiments, locking rods 403 are bolted to vehicle surface 405, and correspond to slots 404a in base plate 404. In one such embodiment, slots 404a pass partially through base plate 404, and together locking rods 403 and slots 404a include a ball and detent mechanism that locks locking rods 403 into slots 404a. In another such embodiment, slots 404a pass completely through base plate 404 such that locking rods 403 pass completely through base plate 404 and are locked in place by, for example, one or more linchpins 403a.

Though the above description is given with respect to specific numeric amounts of side support 401, the battery, spring 402a, magnet 402b, coil set 402c, and locking rods 403 other numeric amounts for each are envisioned. Thus, side support 401 includes at least one side support 401, but also, in many embodiments (such as that depicted in FIGS. 1A-2B), includes two or more side supports; the battery includes at least one battery, but also includes two or more batteries; spring 402a includes one or more springs; magnet 402b includes one or more magnets; coil set 402c includes one or more coil sets; locking rods 403 include one or more locking rods; and slots 404a include one or more slots corresponding to each locking rod. The similar is true for each embodiment described herein; although certain numeric amounts are provided, it is to be understood that other numeric amounts also fall within the scope of the disclosure and are envisioned in conjunction with other embodiments not described herein, but that satisfy the limitations of the claimed invention.

Figure 5A:
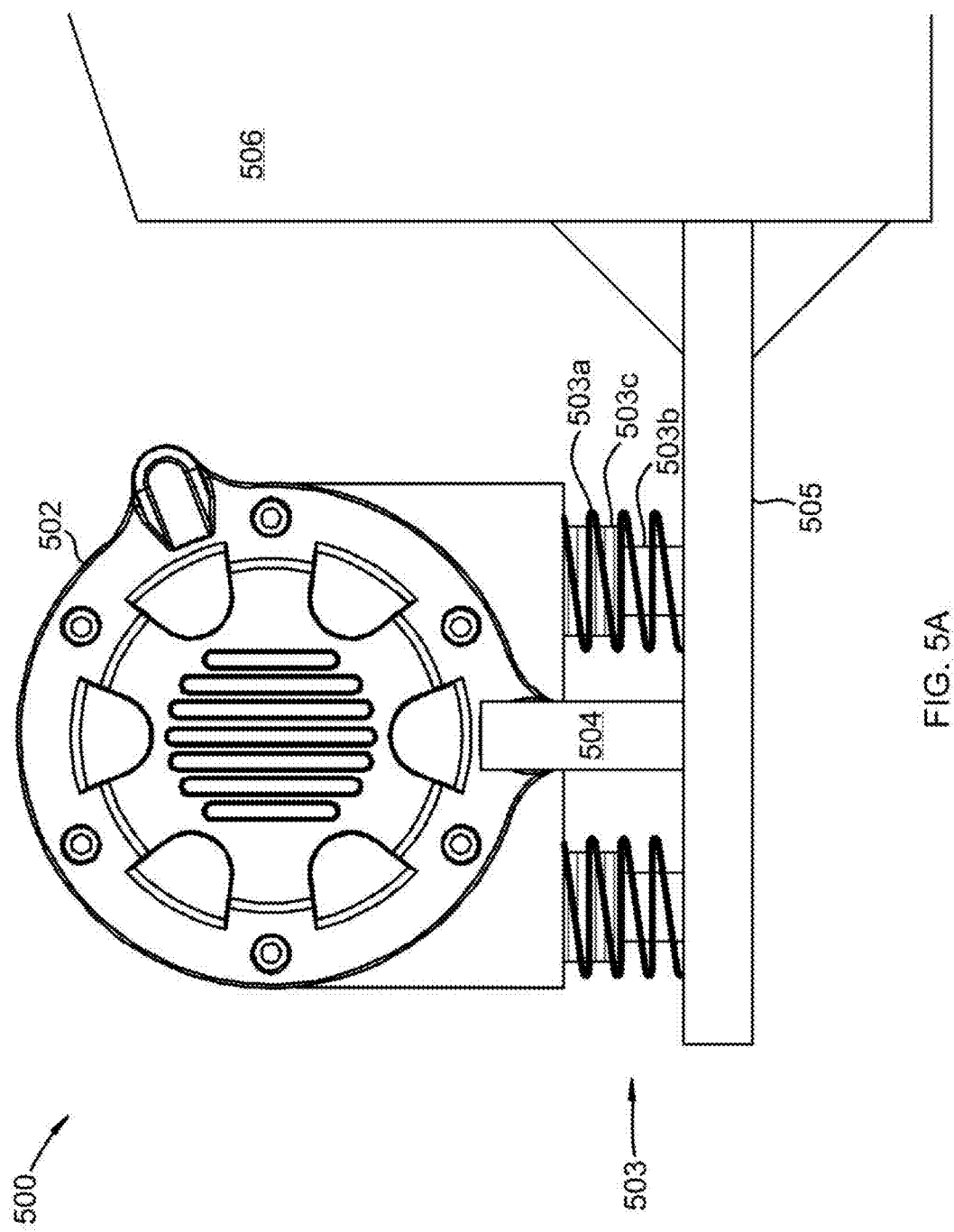
FIGS. 5A-B depict alternative embodiments of the winch mechanism described with regard to FIGS. 4A-D.
Figure 5B:
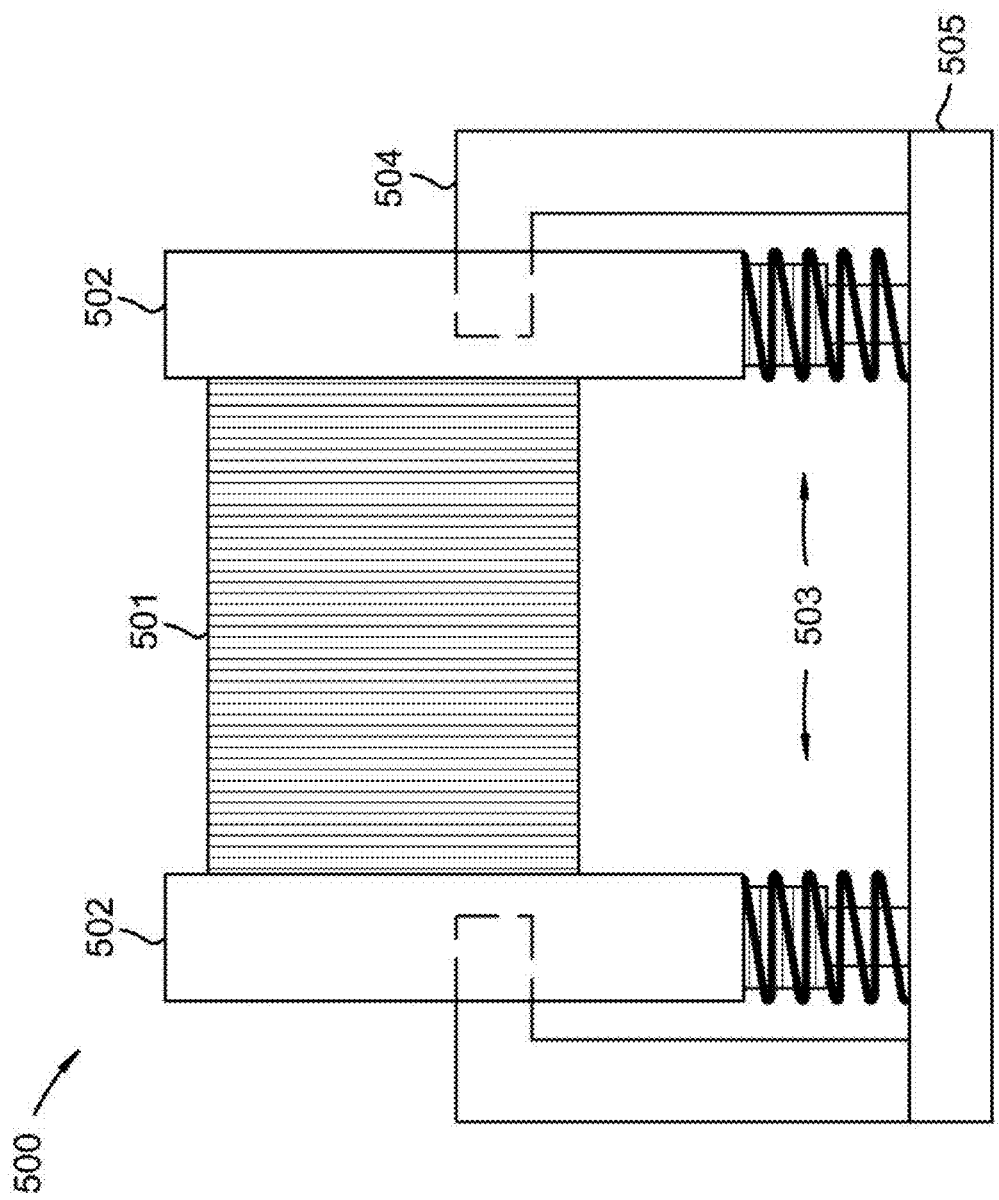

FIGS. 5A-B depict alternative embodiments of the winch mechanism described with regard to FIGS. 4A-D. Similar to winch 400, vehicle winch mechanism 500 includes drum 501, a motor and transmission that drive the drum, side support 502, a battery, and motive trickle charge mechanism 503. Motive trickle charge mechanism 503 charges the battery, and includes springs 503a, permanent magnets 503b, and conductive coil sets 503c, and operates similar to motive trickle charge mechanism 402 described above. Additionally, winch 500 includes locking rods 504 and base plate 505. However, different from winch 400, base plate 505 is disposed beneath side support 502 and coupled directly to vehicle surface 506 and springs 503c. Locking rods 504 mount to mountings surface 505 and extend from base plate 504 into side supports 502. Locking rods 504 lock to side supports 502 in slots in side supports 502 by, for example, a ball and detent system.

Figure 6:
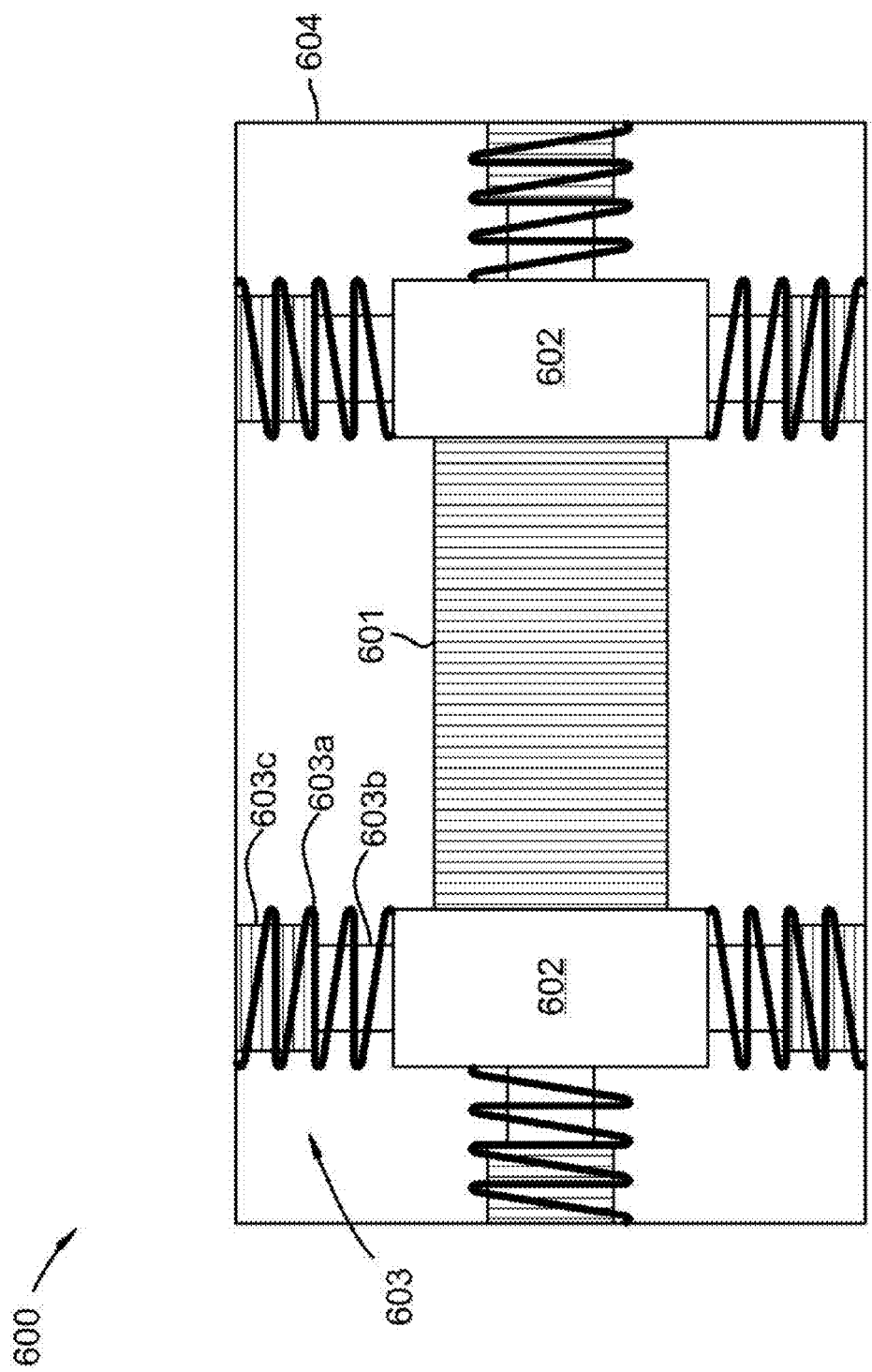
FIG. 6 depicts one other alternative embodiment of the winch mechanism described with regard to FIGS. 4A-D and 5A-B.

FIG. 6 depicts one other alternative embodiment of the winch mechanism described with regard to FIGS. 4A-D and 5A-B. Similar to winches 400 and 500, vehicle winch mechanism 600 includes drum 601, a motor and transmission that drive the drum, side support 602, a battery, and motive trickle charge mechanism 603. Motive trickle charge mechanism 603 charges the battery, and includes springs 603a, permanent magnets 603b, and conductive coil sets 603c, and operates similar to motive trickle charge mechanisms 402, 503 described above. However, different from winches 400 and 500, winch 600 includes base plate 604 that encloses drum 601. Base plate 604 is coupled to a vehicle surface and springs 603a between the vehicle surface and springs 603a.

Figure 7A:
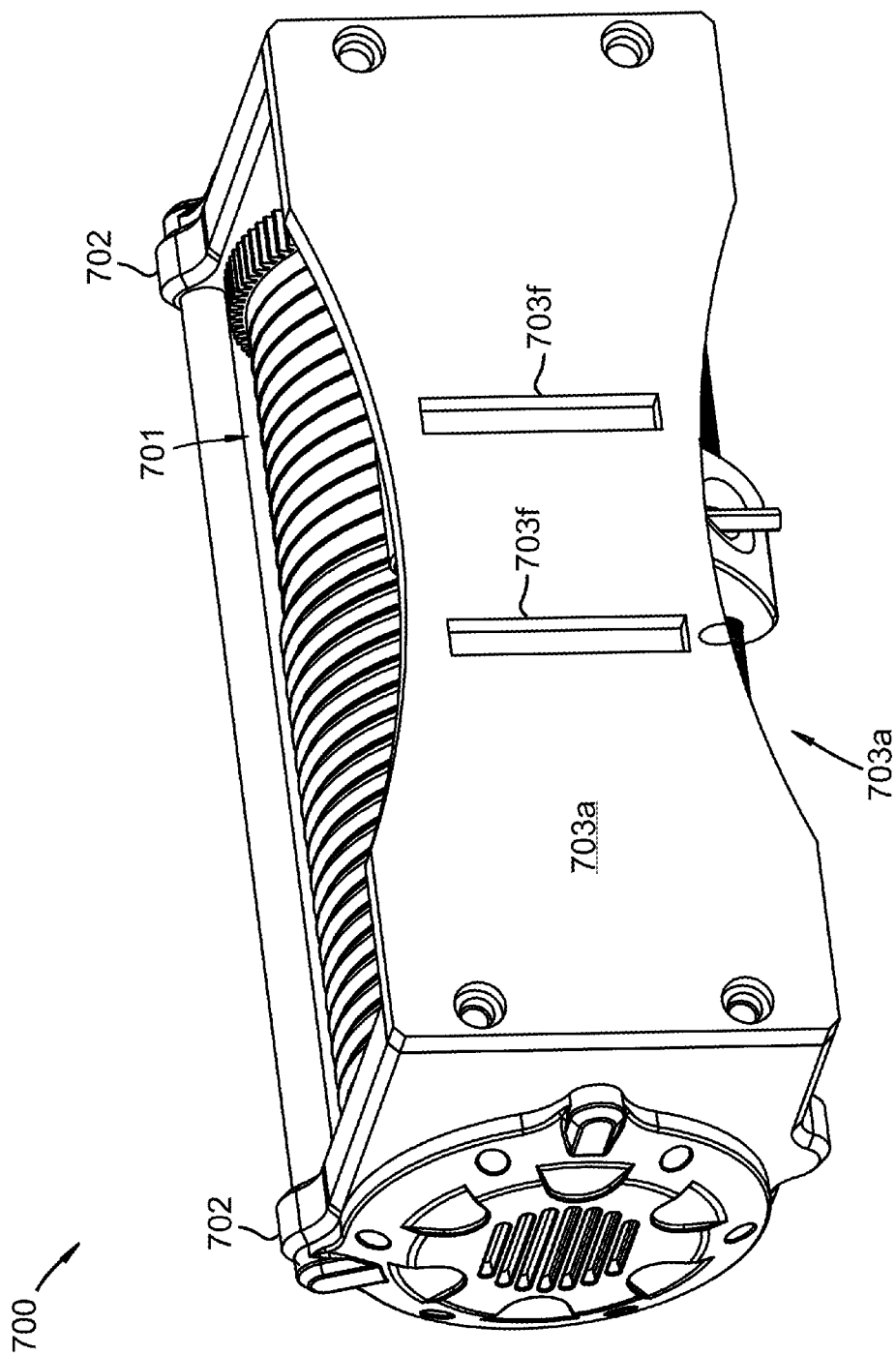
FIGS. 7A-B depict two views of another embodiment of a vehicle winch mechanism according to the claimed invention.
Figure 7B:
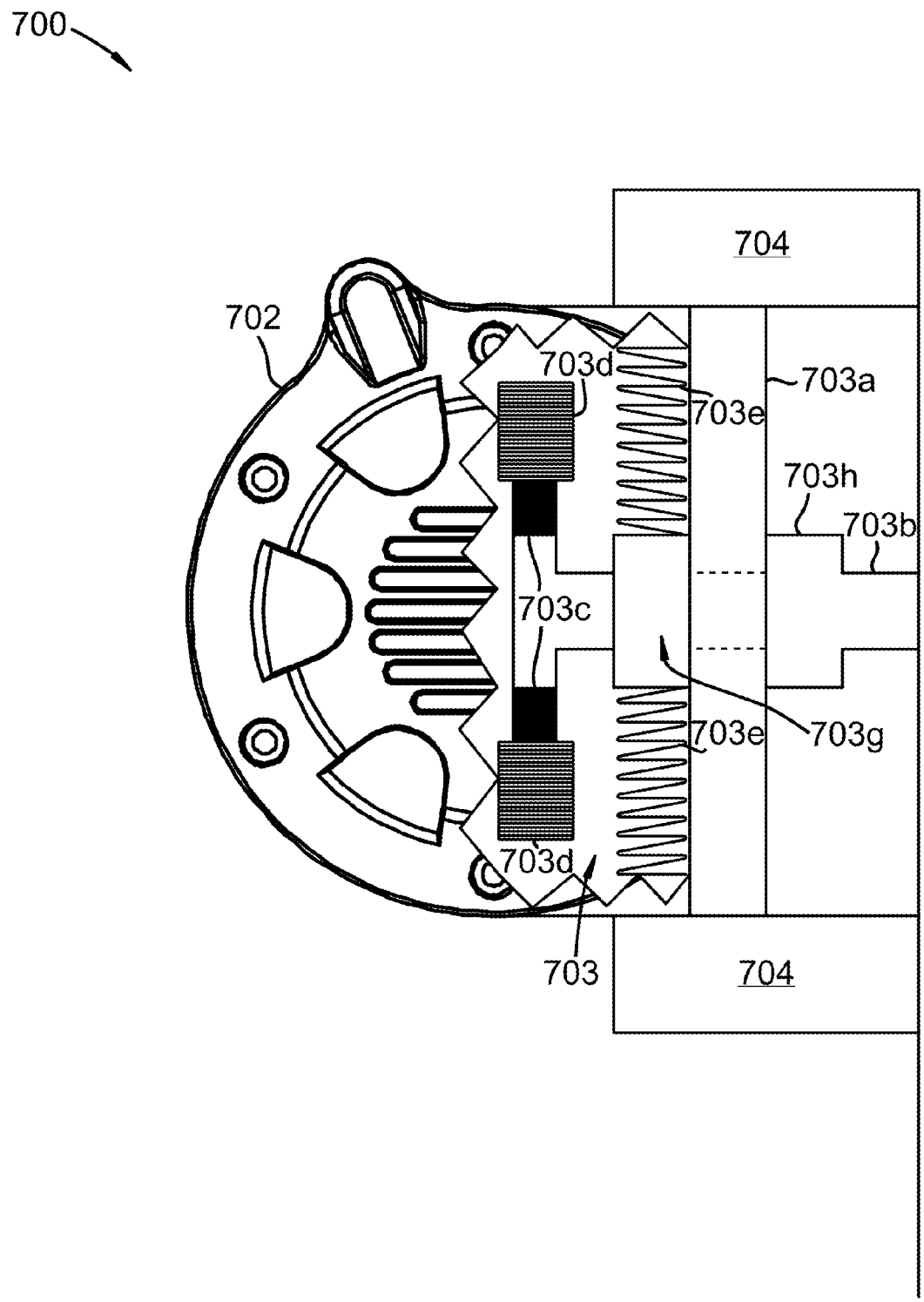

FIGS. 7A-B depict two views of another embodiment of a vehicle winch mechanism according to the claimed invention. Vehicle winch mechanism 700 includes drum 701, a motor and transmission that drive the drum (similar to that described above with regard to FIG. 2B), side supports 702, a battery (such as that described above with regard to FIGS. 2A-3C), and motive trickle charge mechanism 703. Motive trickle charge mechanism 703 charges the battery, and includes base plate 703a, mounting rod 703b, permanent magnets 703c, and conductive coil sets 703d. Additionally depicted, though not necessary in every embodiment, are springs 703e and locking rods 704. Springs 703 at least partially dampen motion of base plate 703a and/or side support 702 relative to rod 703b. Locking rods 704 prevent motion of base plate 703a and/or side supports 702 relative to mounting rod 703b.

Base plate 703a includes vertical slots 703f, and is coupled to side supports 702. Mounting rod 703b couples base plate 703a to vehicle surface 705. Mounting rod 703b includes flanges 703g,h that are larger than any vertical slot 703f, and shaft 703h that is narrower than any vertical slot 703f. Flanges 703g,h are disposed on either side of base plate 703a to secure mounting rod 703b in base plate 703a and allow mounting rod 703a to slide in vertical slot 703f. As depicted, magnets 703c are coupled to flange 703g, and coil sets 703d are coupled to side support 702. However, in other embodiments, magnets 703c are coupled to side support 702, and coil sets 703d are coupled to rod 703b, such as via flange 703g. In any embodiment, magnets 703c and coil sets 703d are mounted such that motion of side support 702 relative to rod 703b causes motion of coil sets 703d relative to magnets 703c. Coil sets 703d are electrically coupled to the battery, and are wrapped around magnets 703c such that magnets 703c move freely through coil sets 703d to induce a current in each coil set 703d. Though magnets 703c and coil sets 703d are depicted outside and away from springs 703e, in some embodiments, magnets 703c and coil sets 703d are disposed within springs 703e.

We claim:
1. A vehicle winch mechanism, comprising:
a drum that pays out and takes in a line;
a motor and transmission that drive the drum;
at least one drum and motor side support that couples the drum, the motor, or both to a vehicle surface;

at least one battery that provides power to the motor; and a motive trickle charge mechanism that charges the battery, comprising:

one or more springs that couple the side support to the vehicle surface;

one or more permanent magnets, each coupled to the vehicle surface or the side support; and one or more sets of conductive coils electrically coupled to the battery, each set of coils wrapped around one magnet such that the magnet moves freely through the coil, and each set of coils coupled to the side support or the vehicle surface such that motion of the side support relative to the vehicle surface causes motion of each set of coils relative to each corresponding magnet.

2. The vehicle winch mechanism of claim 1, further comprising one or more locking rods that lock the winch to the vehicle surface and prevent motion of the winch with respect to the vehicle surface.

3. The vehicle winch mechanism of claim 1, each permanent magnet and its corresponding set of conductive coils disposed within one of the one or more springs.

4. The vehicle winch mechanism of claim 1, further comprising a base plate disposed laterally adjacent to the side support and coupled to the springs between the side support and the springs.

5. The vehicle winch mechanism of claim 1, further comprising a base plate disposed beneath the side support and coupled to the vehicle surface and the springs.

6. The vehicle winch mechanism of claim 1, further comprising a base plate that encloses the drum and that is coupled to the vehicle surface and the springs between the vehicle surface and the springs.

* * * * *